（12）United States Patent
Ito et al.

(10) Patent No.: US 9,200,670 B2
(45) Date of Patent: Dec. 1, 2015

(54) SINTERED BEARING (75) Inventors: Fuyuki Ito, Kuwana (JP); Natsuhiko Mori, Kuwana (JP)

(73) Assignee: NTN CORPORATION, Osaka-shi (JP)

( * ) Notice: Subject to any disclaimer, the term of this patent is extended or adjusted under 35 U.S.C. 154(b) by 250 days.

(21) Appl. No.: 13/824,170

(22) PCT Filed: Sep. 2, 2011

(86) PCT No.: PCT/JP2011/070052
§ 371 (c)(1),
(2), (4) Date: Mar. 15, 2013

(87) PCT Pub. No.: WO2012/043140
PCT Pub. Date: Apr. 5, 2012

(65) Prior Publication Data
US 2013/0182979 A1    Jul. 18, 2013

(30) Foreign Application Priority Data
Sep. 27, 2010    (JP) .................. 2010-215439

(51) Int. Cl.
*C22C 38/16* (2006.01)
*F16C 32/06* (2006.01)
*F16C 33/10* (2006.01)
*B22F 1/00* (2006.01)
*B22F 3/12* (2006.01)
*F16C 17/10* (2006.01)

(52) U.S. Cl.
CPC ............. *F16C 32/0629* (2013.01); *C22C 38/16* (2013.01); *F16C 33/104* (2013.01); *B22F 1/0014* (2013.01); *B22F 3/12* (2013.01); *F16C 17/107* (2013.01); *F16C 2204/10* (2013.01); *F16C 2240/48* (2013.01)

(58) Field of Classification Search
CPC .................................. B22F 3/12; C22C 38/16
See application file for complete search history.

(56) References Cited

U.S. PATENT DOCUMENTS

| 2,974,039 | A | * | 3/1961 | Deventor et al. | ................. | 419/11 |
| 3,142,894 | A | * | 8/1964 | Ross et al. | ..................... | 75/233 |
| 5,895,119 | A | * | 4/1999 | Miyasaka et al. | ............ | 384/279 |

(Continued)

FOREIGN PATENT DOCUMENTS

| CN | 1241250 A | 1/2000 |
| CN | 1603441 A | 4/2005 |

(Continued)

OTHER PUBLICATIONS

International Search Report of PCT/JP2011/070052, mailing date Nov. 8, 2011.

(Continued)

*Primary Examiner* — Jessee Roe
*Assistant Examiner* — Ngoclan T Mai
(74) *Attorney, Agent, or Firm* — Westerman, Hattori, Daniels & Adrian, LLP (57) ABSTRACT

With use of a fine copper-based powder, specifically a copper-based powder that contains particles each having a diameter of 45 μm or less by 80 weight % or more, an air permeability can be significantly reduced. When this copper-based powder is used, a sintered metal can be easily formed to contain copper by 40% or less (contain iron by 60% or more) to enhance abrasion resistance, and to have an oil permeability of 1.00 g/10 min or less to increase an oil film formation rate.

10 Claims, 5 Drawing Sheets

(56) References Cited

U.S. PATENT DOCUMENTS

| | | | |
|---|---|---|---|
| 6,086,257 A * | 7/2000 | Lee | 384/279 |
| 2002/0051590 A1 | 5/2002 | Sugimoto et al. | |
| 2005/0063856 A1 | 3/2005 | Miyasaka | |
| 2005/0078894 A1* | 4/2005 | Miyasaka et al. | 384/279 |
| 2009/0274403 A1* | 11/2009 | Shim et al. | 384/279 |
| 2010/0054982 A1 | 3/2010 | Larsson | |

FOREIGN PATENT DOCUMENTS

| | | |
|---|---|---|
| GB | 2 333 779 A | 8/1999 |
| JP | 10-246230 A | 9/1998 |
| JP | 2001-279349 A | 10/2001 |
| JP | 2002-106568 A | 4/2002 |
| JP | 2002-349575 A | 12/2002 |
| JP | 2008-063663 A | 3/2008 |
| JP | 2009-091661 A | 4/2009 |
| JP | 2010-007141 A | 1/2010 |
| JP | 2010-071350 A | 4/2010 |
| JP | 2010-514935 A | 5/2010 |

OTHER PUBLICATIONS

Translation of the International Preliminary Report on Patentability (PCT/IB/338) (1 page), (PCT/IB/373) (1 page) of International Application No. PCT/JP2011/070052 mailed Apr. 25, 2013 (Form PCT/ISA/237) (4 pages).

JP Office Action dated Feb. 17, 2014, issued in corresponding Japanese application No. 2010-215439.

Chinese Office Action dated Dec. 31, 2014, issued in corresponding Chinese Patent Application No. 201180046297.X, w/English translation (11 pages).

* cited by examiner

SINTERED BEARING

TECHNICAL FIELD

The present invention relates to a sintered bearing, and more particularly, to a copper-iron-based sintered bearing.

BACKGROUND ART

Sintered bearings are used while inner pores thereof are impregnated with a lubricating oil. In accordance with relative rotation of the sintered bearing and a shaft, the lubricating oil impregnated inside the sintered bearing seeps into a sliding portion with respect to the shaft. As a result, oil films are formed, and the shaft is supported through intermediation of those oil films. Owing to quietness and accuracy during high-speed rotation, such sintered bearings have been preferably used for fluid dynamic bearing devices to be incorporated in, for example, a motor spindle for information apparatus (for example, refer to Patent Literature 1).

CITATION LIST

Patent Literature 1: JP 2001-279349 A

SUMMARY OF INVENTION

Technical Problems

As types of the sintered bearing, there are known a copper-based type containing copper as a main component, an iron-based type containing iron as a main component, and a copper-iron-based type containing copper and iron as main components.

Owing to relatively high softness of copper as the main component of the copper-based sintered bearing, the copper-based sintered bearing is liable to be deformed through compression molding. Thus, inner pores of the sintered bearing are liable to be closed. As a result, oil permeability (easiness of permeating oil from an inner diameter side to an outer diameter side of the sintered bearing through application of a certain pressure) is reduced. When the oil permeability is low, a pressure of a lubricating oil in bearing gaps is prevented from being drawn into the inside of the sintered bearing. Thus, pressures of the oil films are more likely to be increased, with the result that excellent supportability can be achieved. However, copper itself is soft, and hence the copper-based sintered bearing is poor in abrasion resistance. In particular, contact with a rotary shaft upon activation and stop of a motor and the like is liable to cause bearing surfaces to be abraded earlier.

Meanwhile, owing to relatively high hardness of iron as the main component of the iron-based sintered bearing, the iron-based sintered bearing is excellent in abrasion resistance of the bearing surfaces . However, iron is not liable to be deformed through compression molding, and hence the inner pores of the sintered bearing are not liable to be closed. As a result, oil permeability increases. Thus, during continuous rotation of a motor and the like, the lubricating oil in the bearing gaps is more liable to be drawn into the inside of the sintered bearing, which prevents satisfactory formation of oil films. As a result, the bearing surfaces and the shaft abut against each other, which may cause troubles such as earlier abrasion of the bearing surfaces and generation of abnormal noise.

The copper-iron-based sintered bearing can be provided with characteristics of both the copper-based type and the iron-based type. In this case, when copper is contained at a higher ratio, there is an advantage that the oil permeability is reduced. However, there is a disadvantage that the abrasion resistance is reduced. Meanwhile, when iron is contained at a higher ratio, there is an advantage that the abrasion resistance is enhanced. However, there is a disadvantage that the oil permeability is increased.

For example, when a density of a sintered metal (sintered density=weight/apparent volume) is set to be high, the number of the inner pores can be reduced, and hence the oil permeability can be reduced. However, when the inner pores of the sintered metal are closed, an amount of the oil impregnated in the sintered metal is reduced. As a result, the oil is significantly deteriorated, and there arises a risk that a life of the sintered bearing is shortened.

As described above, it is significantly difficult for the copper-iron-based sintered bearing to have both high abrasion resistance and a low oil permeability (high oil film formation property). Thus, at present, conditions such as the ratio of copper and iron, the sintered density, and a sintering temperature have been strictly limited, and hence a degree of freedom in design has been significantly low.

It is therefore an object of the present invention to enable a copper-iron-based sintered bearing to easily have both the high abrasion resistance and the low oil permeability and to be designed with a higher degree of freedom.

Solution to Problems

The inventors of the present invention examined oil permeabilities and the like of a copper-iron-based sintered bearing using a copper powder A (conventional product) and a copper-iron-based sintered bearing using a copper powder B (present invention product) . As shown in Table 1, ratios of fine particles having a diameter of 45 µm or less of the copper powder B are higher than that of the copper powder A. Note that, a particle size of the copper powder B was measured in three lots. Further, the ratio of each powder is represented by weight %.

TABLE 1

| | | Copper powder A | Copper powder B (present invention product) | | |
|---|---|---|---|---|---|
| | | (conventional product) | Lot A | Lot B | Lot C |
| Apparent density, g/cm$^3$ | | 1.44 | 1.90 | 1.98 | 1.82 |
| Particle size | >75 µm | 2.6 | 3.9 | 3.8 | 1.3 |
| | 63 to 75 µm | 6.9 | 2.7 | 3.4 | 1.1 |
| | 45 to 63 µm | 23.6 | 7.6 | 9.8 | 3.2 |
| | <45 µm | 66.9 | 85.8 | 83.1 | 94.4 |

Figure 1:
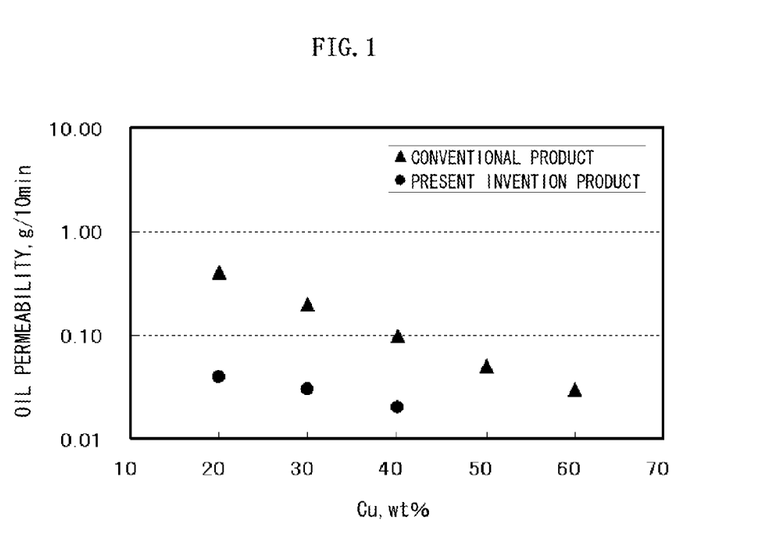
FIG. 1 A graph showing a relationship between a copper ratio and an oil permeability of each sintered bearing.
Figure 2:
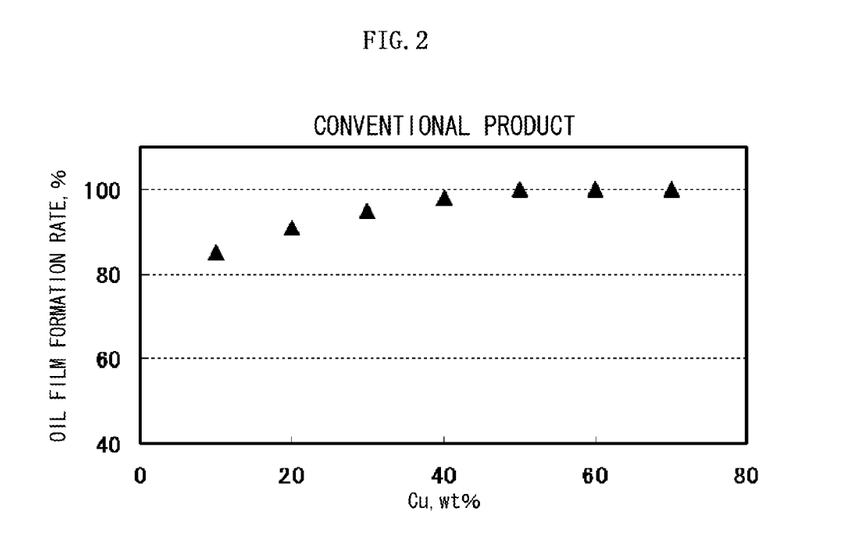
FIG. 2 A graph showing a relationship between a copper ratio and an oil film formation rate of a sintered bearing according to a conventional product.
Figure 3:
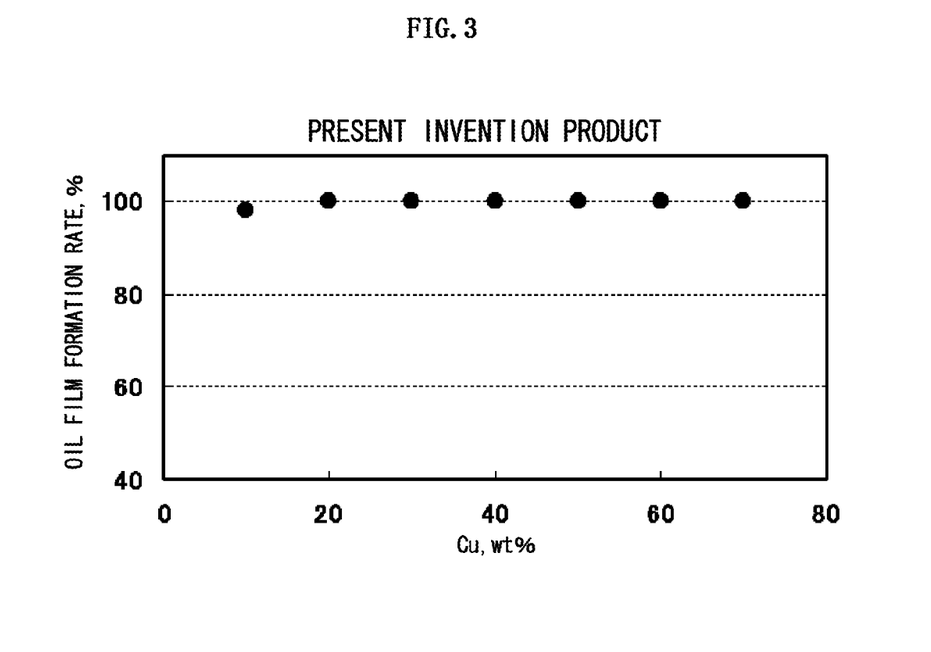
FIG. 3 A graph showing a relationship between a copper ratio and an oil film formation rate of a sintered bearing according to a present invention product.

FIG. 1 shows a relationship between a copper ratio (weight %) and the oil permeability of each of the sintered bearings each having a sintered density of 6.9 g/cm$^3$. As shown in FIG. 1, the oil permeability of the present invention product using the copper powder B is significantly lower (approximately ⅒) than that of the conventional product using the copper powder A at the same rate as that of the copper powder B. For example, the present invention product containing copper by 30% exhibits an oil permeability equivalent to that of the conventional product containing copper by 60%. Further, with reference to FIG. 2 showing a relationship between a copper ratio and an oil film formation rate of the conventional product, as the copper ratio of the conventional product becomes smaller than 50%, the oil film formation rate thereof is gradually deteriorated from 100%. Meanwhile, with reference to FIG. 3 showing a relationship between a copper ratio and an oil film formation rate of the present invention product, even when the copper ratio of the present invention product is low (for example, 20%), the oil film formation rate thereof remains approximately 100%. Those results proved that, even when the abrasion resistance was enhanced by using the copper powder B for reducing the copper ratio, in other words, for increasing an iron ratio, the oil film formation rate was able to be increased without increasing the oil permeability.

Figure 4:
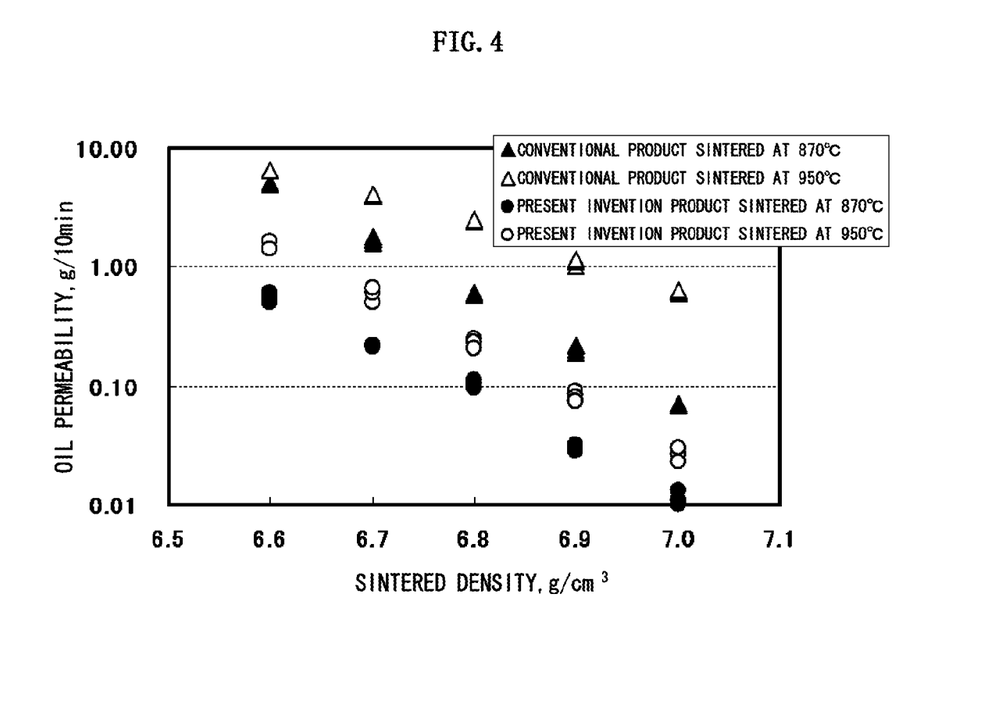
FIG. 4 A graph showing a relationship between a sintered density and an oil permeability of each sintered bearing.

Further, FIG. 4 shows a relationship between a sintered density and an oil permeability of each of the sintered bearings each containing copper by 30%. As shown in FIG. 4, the oil permeability of the present invention product using the copper powder B (indicated by circles in FIG. 4) is significantly lower (approximately 1/10) than that of the conventional product using the copper powder A at the same sintered density as that of the copper powder B (indicated by triangles in FIG. 4). Those results proved that, by using the copper powder B, the oil permeability was able to be lowered without increasing the sintered density, in other words, while securing an oil-impregnated rate.

Those results proved that the oil film formation rate was able to be increased through the reduction of the oil permeability by using the copper powder B, in other words, by refining copper powder. Thus, when the abrasion resistance is increased by increasing the iron ratio and the oil permeability is reduced by using fine copper powder, both the high abrasion resistance and the low oil permeability can be easily achieved. As a result, the degree of freedom in design becomes much higher. The sintered bearing is required, for example, to contain copper by 40% or less (in other words, contain iron by 60% or more) and have an oil permeability of 1.00 g/10 min or less. However, by using fine copper powder, design satisfying such a requirement can be easily made. For example, as in the graph of FIG. 4, when a sintered density of the conventional product using the copper powder A (triangular marks) is set to 6.8 g/cm$^3$, the oil permeability of 1.00 g/10 min can be achieved at a sintering temperature of 870° C. However, this oil permeability of 1.00 g/10 min cannot be achieved at a sintering temperature of 950° C., and hence the sintering temperature is limited to approximately 870° C. Meanwhile, when a sintered density of the present invention product using the copper powder B (circular marks) is set to 6.8 g/cm$^3$, the above-mentioned oil permeability of 1.00 g/10 min can be achieved at both the sintering temperatures of 870° C. and 950° C. Thus, a limitation on the sintering temperature is relaxed as compared to that on the conventional product.

That is, in order to achieve the above-mentioned object, according to the present invention, there is provided a sintered bearing, which is made of a copper-iron-based sintered metal obtained by sintering a compact formed by compressing a copper-based powder and an iron-based powder, the sintered bearing having an inner peripheral surface which functions as a radial bearing surface, wherein the copper-based powder contains particles each having a diameter of 45 μm or less by 80 weight % or more, and wherein the sintered metal contains copper by 40 weight % or less (contains iron by 60% or more), and wherein the copper-iron-based sintered metal has an oil permeability of 1.00 g/10 min or less.

Note that, the "copper-based powder" refers to a metal powder containing copper as a main component, specifically, comprising not only a pure copper powder but also an alloy powder containing copper as a main component. Similarly, the "iron-based powder" refers to a metal powder containing iron as a main component, specifically, comprising not only a pure iron powder but also an alloy powder containing iron as a main component.

Figure 5:
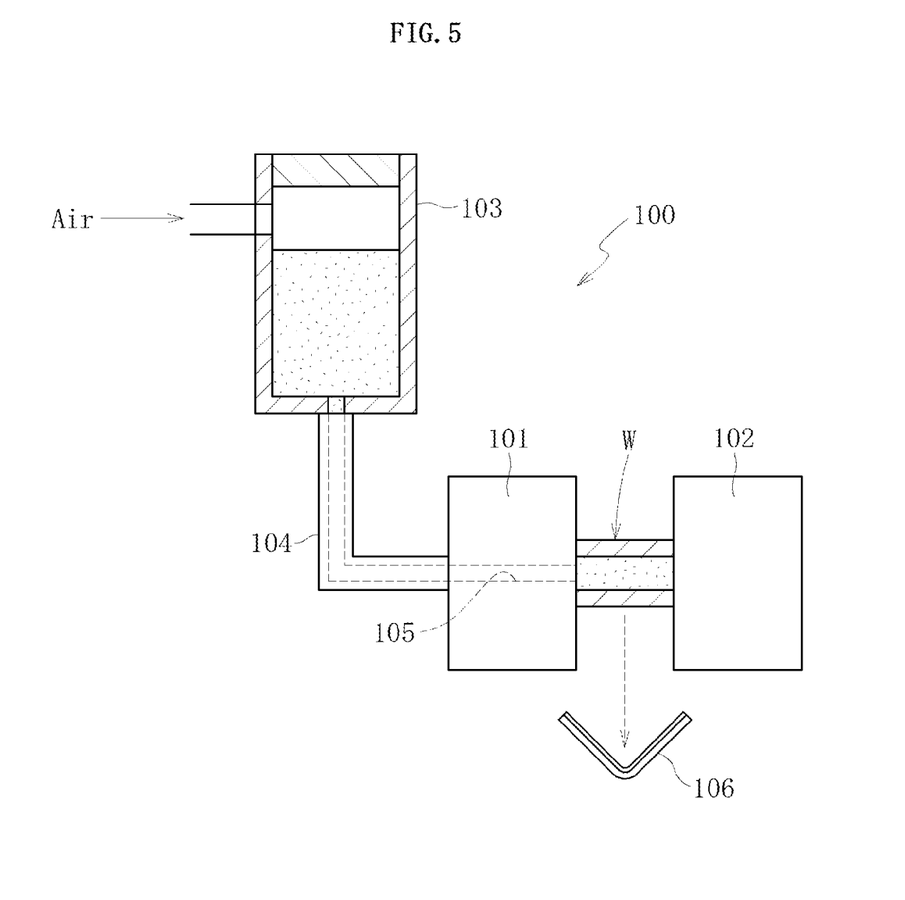
FIG. 5 A conceptual side view of an oil permeability testing apparatus.

The oil permeability is measured by using an oil permeability testing apparatus 100 illustrated in FIG. 5. This oil permeability testing apparatus comprises holding portions 101 and 102 for sandwiching and fixing a cylindrical sample W (sintered bearing) from both sides in the axial direction, and a tank 103 for storing oil. Spaces between both axial end portions of the sample W and the holding portions 101 and 102 are sealed by rubber washers (not shown). The oil (diester-based lubricating oil) stored in the tank 103 is supplied into a space along an inner periphery of the sample W through a pipe 104 and a communication path 105 in the holding portion 101. In a room temperature environment (26° C. to 27° C.), the tank 103 is pressurized with an air pressure of 0.4 MPa so that the oil is supplied from an inner diameter side to an outer diameter side of the sample W for ten minutes. At this time, droplets of the oil, which have seeped and dripped from a surface of the sample W, are collected by being permeated into a cloth (or sheet) 106 arranged below the sample W. Then, the oil permeability is calculated based on a weight difference of the cloth 106 before and after the test.

In the sintered bearing described above, it is unnecessary to increase the sintered density so that the oil permeability is suppressed. For example, the sintered density can be set to 6.9 g/cm$^3$ or less. In this case, an oil-impregnated rate can be secured by 10% or more. Meanwhile, when the sintered density is excessively low, the oil permeability is increased. As a result, pressure loss occurs. Thus, it is preferred to set the sintered density to 6.5 g/cm$^3$ or more. Note that, the "oil-impregnated rate" refers to an oil amount represented in volume percent, which is contained in an impregnated sintered bearing, specifically, represented by $(W2-W1)/(W3 \times \rho) \times 100$ (JIS Z2501), where W1 is a weight of a sintered bearing that has not yet been impregnated with oil, W2 is a weight of the sintered bearing in which oil is impregnated as much as possible in inner pores, W3 is a volume of the sintered bearing, and ρ is an oil-impregnated density.

By the way, when the sintering temperature is increased approximately to the melting point of copper (1,083° C.), the copper starts to be molten, and the copper and iron are further alloyed. As a result, abrasion resistance of the sintered bearing is markedly enhanced. Meanwhile, along with the alloying, points at which the copper existed become voids. As a result, the oil permeability is increased, and the oil film forming rate is reduced. Also in such a case, the oil permeability can be reduced by using the copper-based film which is refined as described above. Thus, even when the sintering temperature is increased to further enhance the abrasion resistance, the oil film forming rate can be secured while suppressing the oil permeability. Note that, when the copper-based powder is perfectly molten, the oil permeability becomes excessively high. Thus, it is preferred to set the sintering temperature to be equal to or lower than the melting point of copper, specifically, within a range of from 850° C. to 1,000° C.

For example, in a sintered bearing comprising a radial bearing surface provided with a radial dynamic pressure generating portion such as a dynamic pressure generating groove, a pressure of an oil film is actively increased in the radial dynamic pressure generating portion, and a rotary shaft is supported by the dynamic pressure action. In this case, when the oil permeability of the sintered bearing is high, the lubricating oil increased in pressure is drawn into the inside of the bearing. As a result, the dynamic pressure action is reduced.

Thus, it is preferred to use the copper-based powder, which is refined as described above, so that the oil permeability is reduced. Further, the same applies to a case where an end surface of the sintered bearing functions as a thrust bearing surface, and a thrust dynamic pressure generating portion is formed on the thrust bearing surface.

Advantageous Effects of Invention

As described above, according to the sintered bearing of the present invention, the oil permeability can be reduced by using the refined copper-based powder. Thus, both the high abrasion resistance and the low oil permeability can be easily achieved, and hence the higher degree of freedom in design can be achieved.

DESCRIPTION OF EMBODIMENT

In the following, description is made of an embodiment of the present invention with reference to the drawings.

Figure 6:
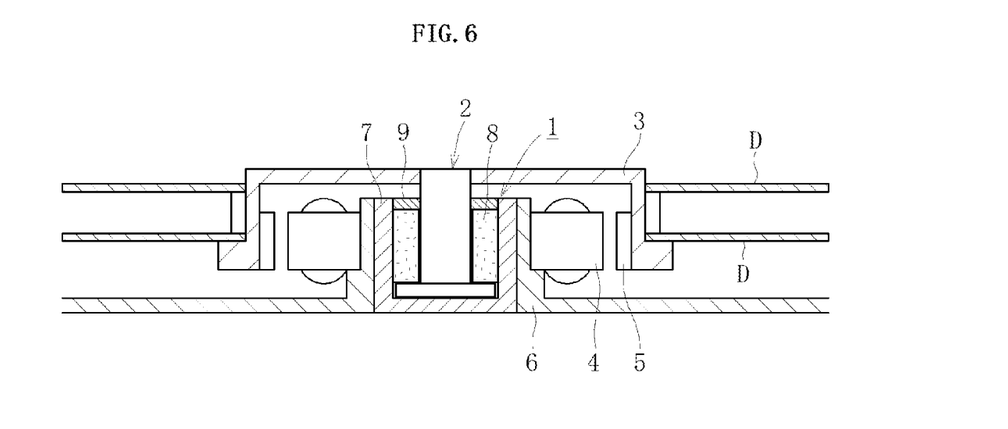
FIG. 6 A sectional view of a motor incorporating a sintered bearing according to an embodiment of the present invention.

A spindle motor illustrated in FIG. 6 is used for disk drive devices such as an HDD, and comprises a fluid dynamic bearing device 1 for supporting a shaft member 2 in a non-contact manner so that the shaft member 2 is freely rotatable, a disk hub 3 fixed to the shaft member 2, and stator coils 4 and rotor magnets 5 facing each other across a gap. The stator coils 4 are fixed to an outer periphery of a motor bracket 6, and the rotor magnets 5 are fixed to an inner periphery of the disk hub 3. The disk hub 3 holds one or a plurality of magnetic disks D (two in FIG. 6) on an outer periphery thereof. In the spindle motor structured as described above, the rotor magnets 5 are rotated by energization of the stator coils 4, and in accordance therewith, the disk hub 3 and the disks D held by the disk hub 3 are rotated integrally with the shaft member 2.

Figure 7:
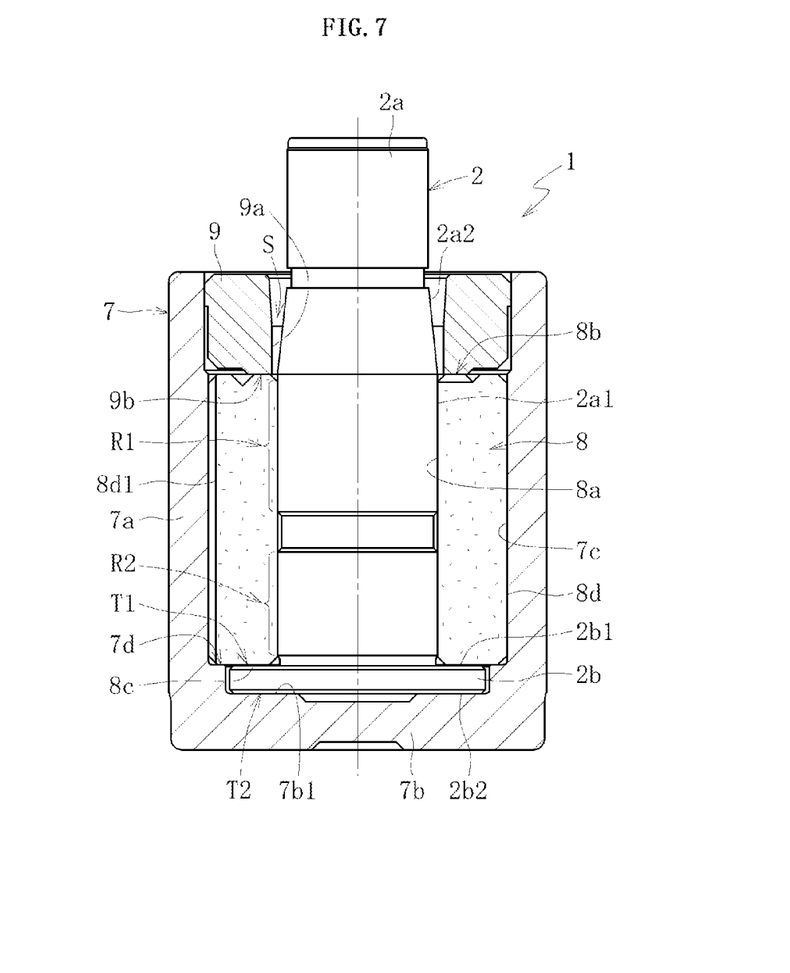
FIG. 7 A sectional view of a fluid dynamic bearing device incorporated in the motor of FIG. 6.

As illustrated in FIG. 7, the fluid dynamic bearing device 1 comprises, as main components, the shaft member 2, a bottomed cylindrical housing 7, a sintered bearing 8 according to the embodiment of the present invention, and a sealing member 9. Note that, in the following description, for the sake of convenience in description, a closed side and an opening side of the housing 7 in an axial direction are respectively referred to as a lower side and an upper side.

The shaft member 2 is made, for example, of a metal material such as stainless steel, and comprises a shaft portion 2a and a flange portion 2b provided at a lower end of the shaft portion 2a. The shaft portion 2a has a cylindrical outer peripheral surface 2a1 and a tapered surface 2a2 gradually reduced in diameter to the upper side. The outer peripheral surface 2a1 of the shaft portion 2a is arranged along an inner periphery of the sintered bearing 8, and the tapered surface 2a2 is arranged along an inner periphery of the sealing member 9.

The sintered bearing 8 is made of a copper-iron-based sintered metal containing copper and iron as main components. The sintered bearing 8 is obtained by sintering a compact formed by compressing a mixed metal powder containing a copper-based powder and an iron-based powder. The sintered bearing 8 contains copper by 40 weight % or less and iron by 60 weight % or more. In this embodiment, copper and iron are contained respectively by 30 weight % and 70 weight %. The copper-based powder used for the sintered bearing 8 contains particles having a diameter of 45 μm or less by 80 weight % or more. For example, the copper powder B in Table 1 above is used. A sintered density is set to 6.9 g/cm$^3$ or less, specifically, to 6.8 g/cm$^3$. A sintering temperature is set to be equal to or lower than the melting point of copper, preferably set within a range of from 850° C. to 1,000° C., specifically, to 950° C. An oil permeability is set to 1.00 g/ 10 min or less, specifically, approximately to 0.2 g/ 10 min (refer to FIG. 4).

With the iron ratio set to be high as described above, abrasion resistance of the sintered bearing 8 is enhanced. Further, with the oil permeability set to be low as described above, a lubricating oil increased in pressure in radial bearing gaps is prevented from being drawn into the inside of the sintered bearing 8. Thus, supportability is enhanced. Further, with use of the above-mentioned fine copper-based powder, the oil permeability can be reduced without increasing the sintered density. Thus, the sintered density can be set to g/cm$^3$ or less as described above. With this, an oil-impregnated rate can be secured by 10% or more. In addition, by reducing the oil permeability with use of the above-mentioned fine copper-based powder, sintering can be performed at a relatively high temperature as described above. As a result, copper and iron are further alloyed, and hence abrasion resistance can be further enhanced.

The fine copper-based powder as described above is obtained, for example, through sieving of copper powder having various particle sizes, or formed with use of copper eluted from waste circuit boards. The latter recycled copper powder contains many fine particles, and hence the fine copper-based powder as described above can be easily obtained.

Further, copper is much more expensive than iron. Thus, in order to achieve cost reduction, as described above, the copper ratio is set to be low while the iron ratio is set to be high. In addition, with use of the recycled copper powder as described above, further cost reduction can be achieved, and burden on the environment can be reduced.

Figure 8:
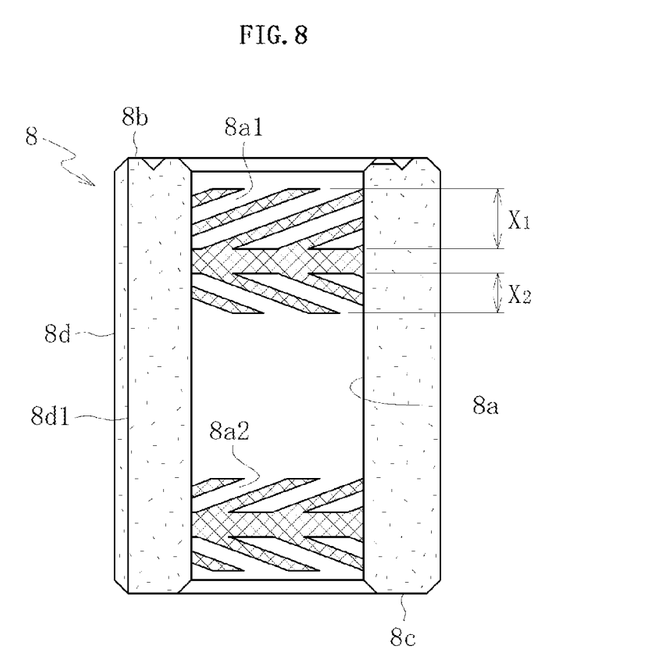
FIG. 8 A sectional view of the sintered bearing according to the embodiment of the present invention.

The sintered bearing 8 has a substantially cylindrical shape, and has an inner peripheral surface 8a which functions as a radial bearing surface. The inner peripheral surface 8a of the sintered bearing 8 is provided with radial dynamic pressure generating portions for generating a dynamic pressure action in the lubricating oil in the radial bearing gaps. In this embodiment, as illustrated in FIG. 8, at two points separate from each other in the axial direction on the inner peripheral surface 8a of the sintered bearing 8, dynamic pressure generating grooves 8a1 and 8a2 in a herringbone pattern are formed as the radial dynamic pressure generating portions. In an upper dynamic pressure generating groove region, the dynamic pressure generating grooves 8a1 are formed to be asymmetrical in the axial direction. Specifically, with respect to a belt-like part formed along a substantially central portion in the axial direction of a hill portion, an axial dimension X1 of upper grooves is set to be larger than an axial dimension X2 of lower grooves (X1>X2). In a lower dynamic pressure generating groove region, the dynamic pressure generating grooves 8a2 are formed to be symmetrical in the axial direction. By a difference in pumping capacity between the upper and lower dynamic pressure generating groove regions as described above, during rotation of the shaft member 2, the oil filled between the inner peripheral surface 8a of the sintered bearing 8 and the outer peripheral surface 2a1 of the shaft portion 2a is forced downward.

Figure 9:
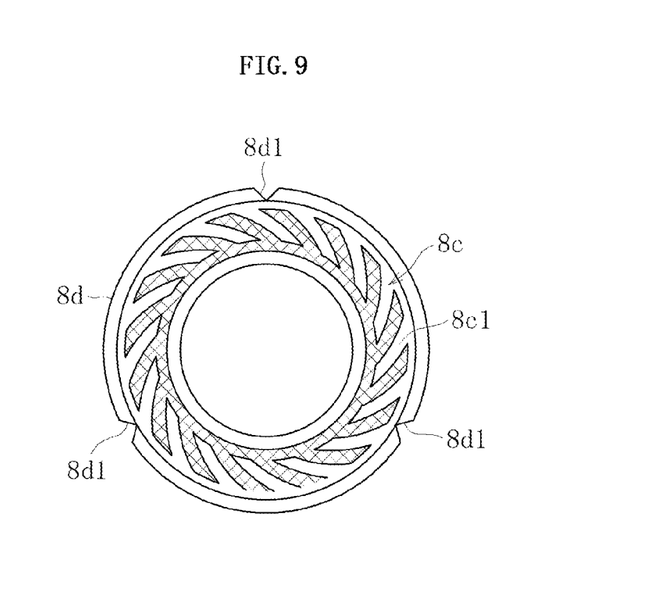
FIG. 9 A bottom view of the sintered bearing of FIG. 8.

The sintered bearing 8 has a lower end surface 8c which functions as a thrust bearing surface. The lower end surface 8c of the sintered bearing 8 is provided with a thrust dynamic pressure generating portion for generating a dynamic pressure action in an oil film within a thrust bearing gap. In this embodiment, as illustrated in FIG. 9, dynamic pressure generating grooves 8c1 in a spiral pattern are formed as the thrust dynamic pressure generating portion in the lower end surface 8c of the sintered bearing 8. The sintered bearing 8 has an outer peripheral surface 8d comprising axial grooves 8d1 formed at a plurality of equiangular points (three points in the illustration). Under a state in which the outer peripheral surface 8d of the sintered bearing 8 and an inner peripheral surface 7c of the housing 7 are fixed to each other, the axial grooves 8d1 function as oil communication paths, and pressure balance inside the bearing can be maintained within an appropriate range by those communication paths.

The housing 7 integrally comprises a cylindrical side portion 7a having an inner periphery along which the sintered bearing 8 is held, and a bottom portion 7b closing a lower end of the side portion 7a. The bottom portion 7b of the housing 7 has an upper end surface 7b1 provided with dynamic pressure generating grooves in, for example, a spiral pattern as a thrust dynamic pressure generating portion for generating a dynamic pressure action in an oil film within a thrust bearing gap (not shown).

The sealing member 9 is obtained by forming a resin material, a metal material, or the like into an annular shape, and is arranged along an inner periphery of an upper end portion of the side portion 7a of the housing 7. The sealing member 9 has an inner peripheral surface 9a facing, in a radial direction, the tapered surface 2a2 provided along an outer periphery of the shaft portion 2a, and a sealing space S gradually reduced downward in radial dimension is formed therebetween. A capillary force of the sealing space S causes the lubricating oil to be drawn into an inner side of the bearing. In this way, oil leakage is prevented. In this embodiment, the tapered surface 2a2 is formed on the shaft portion 2a side, and hence the sealing space S functions also as a centrifugal force seal. The oil surface of the lubricating oil filling an interior space of the housing 7 sealed by the sealing member 9 is maintained within a range of the sealing space S. In other words, the sealing space S has a capacity sufficient to absorb a volumetric change of the lubricating oil.

In the fluid dynamic bearing device 1 structured as described above, in accordance with the rotation of the shaft member 2, the radial bearing gaps are formed between the inner peripheral surface 8a (radial bearing surface) of the sintered bearing 8 and the outer peripheral surface 2a1 of the shaft portion 2a. Pressures of the oil films formed in those radial bearing gaps are increased by the dynamic pressure generating grooves 8a1 and 8a2 formed in the inner peripheral surface 8a of the sintered bearing 8. By the dynamic pressure actions of those dynamic pressure generating grooves 8a1 and 8a2, there are formed a first radial bearing portion R1 and a second radial bearing portion R2 which support the shaft portion 2a in a non-contact manner so that the shaft portion 2a is freely rotatable.

Simultaneously, the oil films are formed respectively in the thrust bearing gap between an upper end surface 2b1 of the flange portion 2b and the lower end surface 8c (thrust bearing surface) of the sintered bearing 8, and in the thrust bearing gap between a lower end surface 2b2 of the flange portion 2b and the upper end surface 7b1 of the bottom portion 7b of the housing 7. The dynamic pressure actions of the dynamic pressure generating grooves cause the pressures of the oil films to be increased. By those dynamic pressure actions, there are formed a first thrust bearing portion T1 and a second thrust bearing portion T2 which support the flange portion 2b in a non-contact manner so that the flange portion 2b is freely rotatable in both sides in a thrust direction.

The present invention is not limited to the embodiment described above. For example, in the embodiment described above, although the dynamic pressure generating grooves in a herringbone pattern are exemplified as the radial dynamic pressure generating portions, the present invention is not limited thereto. For example, there may be employed what is called a step bearing or a wave bearing, or a multi-lobe bearing. Alternatively, there may be employed what is called a cylindrical bearing in which the inner peripheral surface 8a of the sintered bearing 8 and the outer peripheral surface 2a1 of the shaft member 2 are each formed as a cylindrical surface so that none of the radial bearing portions R1 and R2 as dynamic pressure generating portions is formed.

Still further, in the embodiment described above, although the dynamic pressure generating grooves in a spiral pattern are exemplified as the thrust dynamic pressure generating portions, the present invention is not limited thereto. For example, the step bearing, the wave bearing, or the like may be employed. Alternatively, there may be employed a pivot bearing in which the thrust bearing portions T1 and T2 support an end portion of the shaft member in a contact manner. In this case, the lower end surface 8c of the sintered bearing 8 does not function as the thrust bearing surface.

Yet further, in the embodiment described above, the radial dynamic pressure generating portions are formed on the inner peripheral surface 8a of the sintered bearing 8, and the thrust dynamic pressure generating portions are formed on the lower end surface 8c of the sintered bearing 8 and the upper end surface 7b1 of the bottom portion 7b of the housing 7. However, the radial dynamic pressure generating portions and the thrust dynamic pressure generating portions may be formed on surfaces facing those surfaces across the bearing gaps, that is, the outer peripheral surface 2a1 of the shaft portion 2a and the upper end surface 2b1 and the lower end surface 2b2 of the flange portion 2b.

Yet further, the fluid dynamic bearing device of the present invention is not limited to use for a spindle motor to be used in a disk drive device such as an HDD as described above, and may be suitably used as follows: in a small motor for information apparatus to be used at high-speed rotation, such as a spindle motor for driving magneto-optical disks; for supporting a rotary shaft of, for example, a polygon scanner motor of a laser beam printer; or in a motor of a cooling fan for electrical apparatus.

REFERENCE SIGNS LIST 1 fluid dynamic bearing device
2 shaft member
3 disk hub
4 stator coil
5 rotor magnet 6 motor bracket
7 housing
8 sintered bearing
8*a* inner peripheral surface (radial bearing surface)
8*a*1, 8*a*2 dynamic pressure generating groove (radical dynamic pressure generating portion)
8*c* lower end surface (thrust bearing surface)
8*c*1 dynamic pressure generating groove (thrust dynamic pressure generating portion)
9 sealing member
D disk
R1, R2 radial bearing portion
T1, T2 thrust bearing portion
S sealing space

The invention claimed is:

1. A sintered bearing, which is made of a copper-iron-based sintered metal obtained by sintering a compact formed by compressing a copper-based powder and an iron-based powder, the sintered bearing having an inner peripheral surface which functions as a radial bearing surface,
   wherein the copper-based powder contains particles each having a diameter of 45 μm or less by more than 80 weight %,
   wherein the copper-iron-based sintered metal contains copper by 40 weight % or less and iron by 60 weight % or more, and
   wherein the copper-iron-based sintered metal has an oil permeability of 1.00 g/10 min or less.

2. A sintered bearing according to claim 1, wherein the copper-iron-based sintered metal has a sintered density of 6.9 g/cm$^3$ or less.

3. A sintered bearing according to claim 2, wherein the copper-iron-based sintered metal has an oil-impregnated rate of 10% or more.

4. A sintered bearing according to claim 1, wherein the sintering is performed at a sintering temperature that is equal to or lower than a melting point of copper.

5. A sintered bearing according to claim 4, wherein the sintering temperature is set within a range of from 850° C. to 1,000° C.

6. A sintered bearing according to claim 1, wherein the radial bearing surface comprises a radial dynamic pressure generating portion.

7. A sintered bearing according to claim 6, further comprising an end surface which functions as a thrust bearing surface,
   wherein the thrust bearing surface comprises a thrust dynamic pressure generating portion.

8. A sintered bearing according to claim 2, wherein the sintering is performed at a sintering temperature that is equal to or lower than a melting point of copper.

9. A sintered bearing according to claim 3, wherein the sintering is performed at a sintering temperature that is equal to or lower than a melting point of copper.

10. A manufacturing method of a sintered bearing, comprising:
   forming a compact by compressing a mixed metal powder containing a copper-based powder and an iron-based powder; and
   sintering the compact so as to obtain the sintered bearing made of a copper-iron-based sintered metal,
   wherein the copper-based powder contains particles each having a diameter of 45 μm or less by more than 80 weight %,
   wherein the copper-iron-based sintered metal contains copper by 40 weight % or less and iron by 60 weight % or more,
   wherein the sintered bearing has an inner peripheral surface which functions as a radial bearing surface, and
   wherein the sintered bearing has an oil permeability of 1.00 g/10 min or less.

* * * * *